US007284163B2

(12) United States Patent
Bhattacharjee et al.

(10) Patent No.: US 7,284,163 B2
(45) Date of Patent: Oct. 16, 2007

(54) EVENT MECHANISM FOR REPORTING DIAGNOSTIC EVENT MESSAGES

(75) Inventors: Saikat Bhattacharjee, Norcross, GA (US); Paul Anthony Rhea, Lawrenceville, GA (US); Ganesan Vengateswaran, Ashok Nagar (IN)

(73) Assignee: American Megatrends, Inc., Norcross, GA (US)

( * ) Notice: Subject to any disclaimer, the term of this patent is extended or adjusted under 35 U.S.C. 154(b) by 787 days.

(21) Appl. No.: 10/355,315

(22) Filed: Jan. 31, 2003

(65) Prior Publication Data

US 2004/0152951 A1    Aug. 5, 2004

(51) Int. Cl.
*G06F 11/00* (2006.01)
(52) U.S. Cl. .................. 714/48; 719/318; 719/313
(58) Field of Classification Search ................ None
See application file for complete search history.

(56) References Cited

U.S. PATENT DOCUMENTS

| | | | |
|---|---|---|---|
| 5,023,873 A | | 6/1991 | Stevenson et al. |
| 6,460,151 B1* | | 10/2002 | Warwick et al. ............ 714/718 |
| 6,467,054 B1 | | 10/2002 | Lenny |
| 6,609,217 B1 | | 8/2003 | Bonissone et al. ............ 714/26 |
| 6,697,969 B1 | | 2/2004 | Merriam |
| 6,738,931 B1 | | 5/2004 | Osborn et al. ................ 714/37 |
| 6,754,664 B1* | | 6/2004 | Bush ........................... 707/102 |
| 6,865,691 B1 | | 3/2005 | Brundridge et al. |
| 7,010,718 B2 | | 3/2006 | Ogawa et al. ................. 714/4 |
| 7,043,566 B1* | | 5/2006 | Grant et al. ................ 719/323 |
| 7,139,938 B2 | | 11/2006 | Marwaha ..................... 714/48 |
| 2002/0103612 A1 | | 8/2002 | Szucs et al. |
| 2003/0009373 A1 | | 1/2003 | Ensing et al. |
| 2003/0028826 A1 | | 2/2003 | Balluff |
| 2003/0140279 A1 | | 7/2003 | Szucs et al. |
| 2004/0006652 A1* | | 1/2004 | Prall et al. .................. 709/318 |
| 2004/0083406 A1 | | 4/2004 | Goto |
| 2005/0081111 A1* | | 4/2005 | Morgan et al. ............... 714/38 |

OTHER PUBLICATIONS

"A Diagnostic Model In CIM," Distributed Management Task Force-DMTF, Jan. 6, 2000, www.dmtf.org/var/release/Whitepapers.
U.S. Appl. No. 10/352,577, filed Jan. 31, 2003, entitled "Method, System, and Apparatus for Utilizing Device-Specific Diagnostic Settings Within A Standard Management Platform," Inventors: Saikat Bhattacharjee Ganesan Vengateswaran; Paul A. Rhea; Stefano Righi.
U.S. Appl. No. 10/358,515, filed Feb. 5, 2003, entitled "Method and System for Logging and Accessing Diagnostic Result Messages," Inventors: Paul Anthony Rhea; Saikat Bhattacharjee; Satheesh Thomas.

* cited by examiner

*Primary Examiner*—Robert W. Beausoliel, Jr.
*Assistant Examiner*—Yolanda L Wilson
(74) *Attorney, Agent, or Firm*—Hope Baldauff Hartman, LLC (57) ABSTRACT

An instrumentation data provider module is provided for use within a diagnostics application program. The instrumentation data provider module provides a communication path between legacy, or proprietary, diagnostics modules and a standard instrumentation platform. Through the instrumentation data provider module, diagnostics status messages may be translated into event messages and forwarded to the instrumentation platform. A data consumer module for use within a diagnostics application program is also provided. The instrumentation data consumer module provides a communication path between a presentation layer and an instrumentation platform. Through the data consumer module, a management console or other type of management application can register for and receive events from the instrumentation platform.

20 Claims, 9 Drawing Sheets

EVENT MECHANISM FOR REPORTING DIAGNOSTIC EVENT MESSAGES

TECHNICAL FIELD

Embodiments of the invention generally relate to the field of computer diagnostics and, more particularly, to the field of generating and receiving instrumentation events during the execution of diagnostic modules.

BACKGROUND OF THE INVENTION

Diagnostic application programs, also called "diagnostics," provide functionality for testing components in a computer system. Typical diagnostics include a console program that allows a user to control the operation of the diagnostics and one or more diagnostics modules that perform the actual diagnostic tests. Diagnostics modules are available that can test virtually all of the components in a computer system. For instance, diagnostic modules exist for testing the operation of central processing units, main memory, mass storage devices, video cards, input/output devices, network devices, and other components of a computer system.

In order to provide a high level of feedback to a user during the execution of a diagnostic module, a large number of messages are typically generated by the diagnostics module that describe its current status. For instance, diagnostic status messages may be generated identifying the diagnostic activity currently taking place, the status of the diagnostic activity, the percentage completed, and whether the diagnostic module has completed its processing.

In order to present the diagnostic status messages to a user of the diagnostics, the diagnostic modules typically communicate with the console program over a proprietary or legacy interface. Through such an interface the diagnostics modules can transmit diagnostic status messages to the console which may then be displayed to the user by the console. Although a proprietary or legacy interface allows messages to be exchanged easily between a console and diagnostics modules, such an interface prohibits access to the messages by external applications. For instance, a user that would like to use a third-party console program to interact with diagnostics modules provided by another manufacturer would typically be unable to do so due to the incompatible interfaces between the console program and diagnostics modules.

One way console programs can be used with diagnostics modules created by different manufacturers is through the use of a management platform, such as the Common Diagnostic Model ("CDM"). CDM defines standard enabling building blocks that allow "plug-in" diagnostics modules to be integrated with console programs, also called management applications. This allows management applications to execute diagnostics modules meant for different devices, and provided by different manufacturers, over a single, uniform, and consistent interface. The CDM architecture is scalable and applicable to many platforms.

While CDM allows diagnostics modules provided by different manufacturers to be utilized with virtually any management application, the CDM platform is not without its drawbacks. One such drawback arises from the fact that diagnostics modules that communicate with a console program via a proprietary or legacy interface are not compatible with CDM. In order to make such diagnostics modules compatible with CDM, they must be rewritten. However, rewriting a diagnostics module for compatibility with CDM can be a time consuming and expensive process.

Another drawback to CDM is caused by the mechanism utilized by CDM to handle the reporting of diagnostic status messages. CDM utilizes a diagnostics results object that is periodically populated with information regarding the status of the diagnostic. In order to retrieve the data from the results object, the object must be periodically polled by the console program, or management application, to retrieve the data. Because this mechanism requires that data be "pulled" from the results object, it suffers from a number of serious drawbacks.

For instance, use of CDM's mechanism for polling a results object may result in an unnecessary poll of the results object when no data is available, an unnecessary poll of the results object when the results data has not changed since the last poll, and may result in important data being ignored until the next time the results object is polled. In this scenario, the test status is updated based on the time interval of the polling, rather than at a rate dictated by the diagnostic itself.

Therefore, in light of the above, there is a need for a diagnostic application program that can interface legacy diagnostic modules with a standard instrumentation platform without modification of the legacy modules. There is also a need for a diagnostic application program that can generate diagnostic event messages to an instrumentation platform concurrent with the execution of a diagnostic module that does not require polling of a results object to receive the event messages.

SUMMARY OF THE INVENTION

Embodiments of the present invention solve the above-described problems by providing a method, system, and apparatus that can interface legacy diagnostic modules and a standard instrumentation platform without requiring that the legacy modules be rewritten or modified. Embodiments of the invention also solve the above-described problems by providing a method, system, and apparatus for transmitting diagnostic event messages to an instrumentation platform concurrent with the execution of a diagnostic module in a manner that does not require polling of a results object to receive the event messages.

Generally described, embodiments of the invention provide an instrumentation data provider module for use within a diagnostics application program. The instrumentation data provider module interfaces legacy, or proprietary, diagnostics modules with a standard instrumentation platform. Through the instrumentation data provider module, diagnostics status messages may be translated into event messages and forwarded to the instrumentation platform. Applications that have registered with the instrumentation platform to receive the messages will then receive the messages without polling a results object. The instrumentation data provider module may also translate messages from the instrumentation platform that allow the diagnostic module to be utilized by third-party diagnostics.

Embodiments of the present invention also provide an instrumentation data consumer module for use within a diagnostics application program. The instrumentation data consumer module interfaces a presentation layer with an instrumentation platform. Through the data consumer module, a management console or other type of management application can register for and receive events from the instrumentation platform. The data consumer module also permits a legacy console or management application to utilize third-party diagnostics modules configured for use with the instrumentation platform and not otherwise usable with the console application.

Embodiments of the invention also provide a method, system, apparatus, and computer-readable medium for reporting diagnostic event messages. Additional details regarding the various embodiments of the present invention will be described in greater detail below in the Detailed Description that follows.

DETAILED DESCRIPTION OF AN ILLUSTRATIVE EMBODIMENT

As described briefly above, embodiments of the present invention provide a method, system, apparatus, and computer-readable medium for reporting diagnostic event messages. Referring now to the figures, in which like numerals represent like elements, several illustrative embodiments of the present invention will be described. It should be appreciated that the embodiments described herein are merely illustrative and that the various embodiments may be combined, other embodiments may be utilized, and structural, logical, and electrical changes may be made without departing from the spirit and scope of the present invention. The following detailed description is, therefore, not to be taken in a limiting sense, and the scope of the present invention is defined only by the appended claims and their equivalents.

Figure 1:
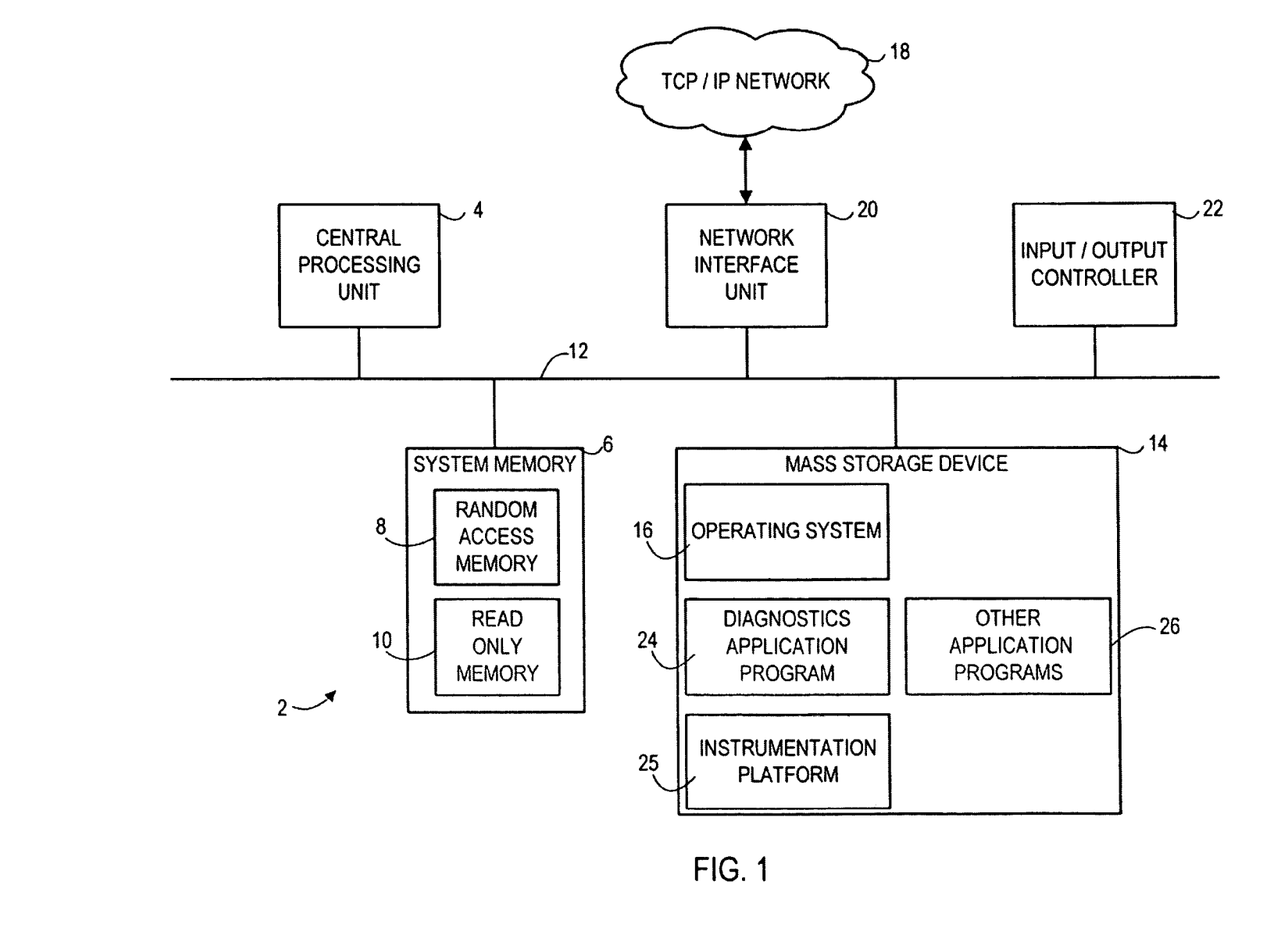
FIG. 1 is a block diagram showing an illustrative architecture for a computer utilized to practice various embodiments of the present invention.

Turning now to FIG. 1, an illustrative computer architecture for a computer 2 for practicing the various embodiments of the invention will be described. The computer architecture shown in FIG. 1 illustrates a conventional computer system, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, programs, such as a diagnostics application program 24, an instrumentation platform 25, other applications programs 26, and data.

The mass storage device 14 is connected to the CPU 4 through a mass storage controller (not shown) connected to the bus 12. The mass storage device 14 and its associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embodies computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

According to various embodiments of the invention, the computer 2 may operate in a networked environment using logical connections to remote computers through a TCP/IP network 18, such as the Internet. The computer 2 may connect to the TCP/IP network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the computer 2, including an operating system 16 suitable for controlling the operation of the computer 2, such as the WINDOWS family of operating systems from MICROSOFT CORPORATION of Redmond, Wash. Other types of suitable operating systems may also be utilized. The mass storage device 14 and RAM 8 may also store one or more executable programs. In particular, the mass storage device 14 and RAM 8 may store a diagnostics application program 24.

The diagnostics application program 24 is one or more executable programs for performing tests on the computer 2 and diagnosing failures and potential failures within the various systems of the computer 2. The diagnostics application program 24 may perform tests on the mass storage device 14, the system memory 6, the network interface unit 20, and other components of the computer 2. Additional details regarding the architecture and operation of the diagnostics application program 24 according to the various embodiments provided herein will be provided below with respect to FIGS. 2-9.

As described briefly above, the mass storage device 14 and RAM 8 may store an instrumentation platform 25. As known to those skilled in the art, the instrumentation platform 25 comprises one or more executable programs for modeling components within a computer system and for receiving configuration, status, and operational information from the components. The instrumentation platform 25 is also capable of executing diagnostics on system components and receiving events generated by system components. Additional details regarding the use and operation of an illustrative instrumentation platform 25 will be described below with reference to FIG. 5.

Figure 2:
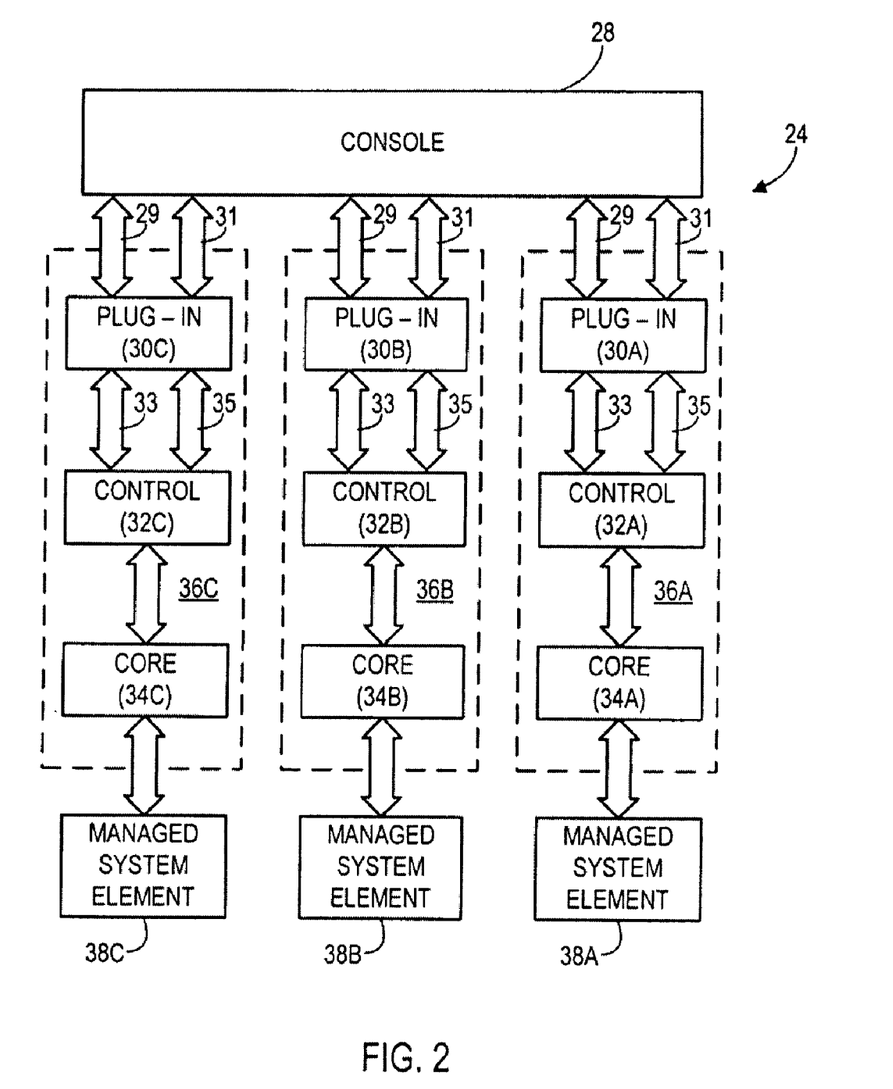
FIG. 2 is a software architecture diagram showing an illustrative software architecture for a diagnostics application program provided according to one embodiment of the present invention.

Turning now to FIG. 2, various aspects of a diagnostics application program 24 will be described. As mentioned briefly above, the diagnostics application program 24 comprises one or more executable software components capable of performing tests on the computer 2 and diagnosing failures and potential failures within the various systems of the computer 2. According to one embodiment of the invention, the diagnostics application program 24 is implemented as a multi-layer stack. At the top of the stack is a console application 28 and at the bottom of the stack is one or more managed system elements 38A-38C.

The console application 28 comprises an executable application program for controlling the operation of the diagnostics application program 24. For instance, the console application 28 may receive user input identifying particular managed system elements 38A-38C upon which diagnostics should be performed. The console application 28 may also receive the identities of particular tests that should be performed on the managed system elements 38A-38C. Additionally, the console application 28 may receive and display information regarding the progress of the diagnostic and its success or failure once the diagnostic has been completed. The console application 28 may also provide other functionality for executing diagnostics in a batch mode.

In order to provide the above-described functionality, the console application 28 communicates with a diagnostics "triplet" 36A-36C for each managed system element 38A-38C. A triplet 36A-36C comprises a plug-in 30A-30C, a diagnostics control module 32A-32C, and a diagnostics core 34A-34C. The plug-ins 30A-30C relay diagnostic information between the console 28 and the control 32 and convert system information from a proprietary format to a format usable by the console 28. Moreover, the plug-ins 30A-30C receive input such as the selection of particular diagnostic test settings and pass the information to the connected diagnostics control module 32. Other types of commands, such as commands for starting or stopping a diagnostic, may also be passed from the plug-ins 30A-30C to the appropriate diagnostics control module 32A-32C. In order to facilitate communication between the plug-ins 30A-30C and the console application 28, an interface 29 is provided for exchanging system information and a separate interface 31 is provided for exchanging diagnostic information.

The diagnostic cores 34A-34C communicate directly with the appropriate managed system element 38A-38C and perform the actual diagnostic tests. The diagnostic cores 34A-34C also gather information about a particular managed system element 38A-38C and pass the information to the appropriate diagnostics control modules 32A-32C. The diagnostics control modules 32A-32C then pass the information back to the appropriate plug-in 30A-30C.

According to various embodiments of the invention, the diagnostics control modules 32A-32C and the plug-ins 30A-30C are implemented as component object model ("COM") objects. The diagnostics control modules 32A-32C and the plug-ins 30A-30C communicate via an interface 33 for exchanging system information 33 and a separate interface 35 for exchanging diagnostic information. The diagnostic cores 34A-34C are implemented as standard dynamically linked libraries ("DLLs").

It should be appreciated that a managed system element 38A-38C may comprise any of the components of a computer system, including software components. For instance, a managed system element 38A may comprise a graphics card or processor, an audio card or processor, an optical drive, a central processing unit, a mass storage device, a removable storage device, a modem, a network communications device, an input/output device, or a cable. It should also be appreciated that this list is merely illustrative and that managed system elements 38A-38C may comprise other types of computing components.

Figure 3:
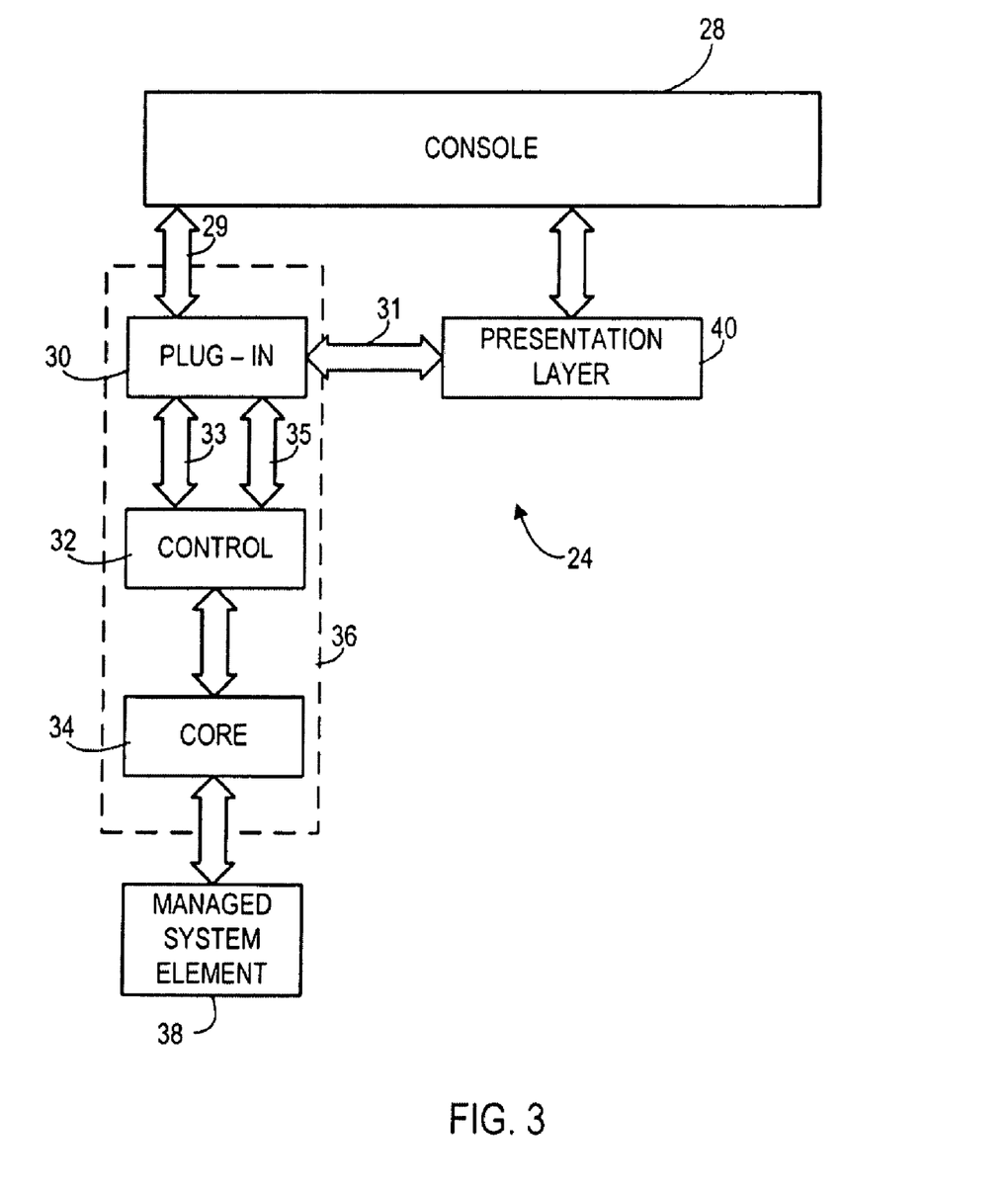
FIG. 3 is a software architecture diagram showing aspects of an illustrative software architecture for a diagnostics application program provided according to one embodiment of the present invention.

Referring now to FIG. 3, additional aspects of a diagnostics application program 24 provided according to various embodiments of the invention will be described. As shown in FIG. 3, a separate presentation layer 40 for diagnostic information may be interposed between each of the plug-ins 30A-30C and the console application 28. The console application 28 and the plug-ins 30 retain the interface 29 for communicating system information. However, the console application 28 and the plug-ins 30A-30C can communicate diagnostics information through the presentation layer 40 as if they were communicating directly with each other.

According to various embodiments of the invention, the presentation layer 40 provides an interface to the plug-ins 30A-30C to external programs. For instance, according to one embodiment of the invention, the presentation layer 40 provides functionality for utilizing the diagnostics triplet 36 with a console other than the console application 28, such as a console application provided by a third-party manufacturer. Similarly, the presentation layer 40 may provide functionality for accessing the triplet 36 from a script or a Web page.

In order to provide the above-described functionality, the presentation layer 40 is implemented as an ACTIVEX control in one embodiment of the invention. As known to those skilled in the art, ACTIVEX controls are a type of COM component that can self-register. COM objects implement the "IUnknown" interface but an ACTIVEX control usually also implements some of the standard interfaces for embedding, user interface, methods, properties, events, and persistence. Because ACTIVEX components can support the object linking and embedding ("OLE") interfaces, they can also be included in Web pages. Because they are COM objects, ACTIVEX controls can be used from languages such as VISUAL BASIC, VISUAL C++, and VBSCRIPT from MICROSOFT CORPORATION, and JAVA from SUN MICROSYSTEMS.

Figure 4:
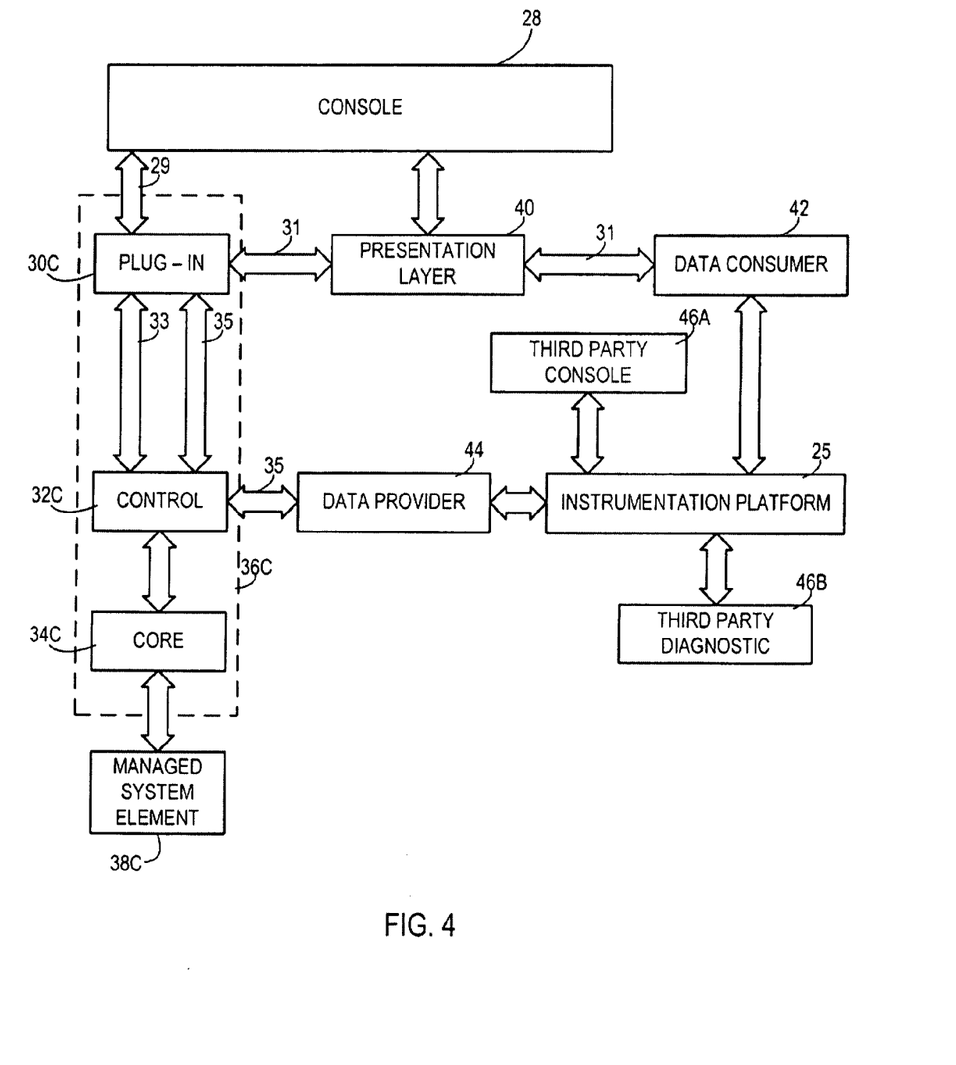
FIG. 4 is a software architecture diagram showing an illustrative software architecture for a diagnostics application program provided according to one embodiment of the present invention.

Turning now to FIG. 4, additional aspects of a diagnostics application program 24 provided according to various embodiments of the invention will be described. As shown in FIG. 4, in various embodiments of the present invention, an instrumentation data consumer 42 and an instrumentation data provider 44 are provided for enabling communication with an instrumentation platform 25.

The instrumentation data provider 44 provides a communication path between the instrumentation platform 25 and the diagnostic control module 32C. In this manner, a third-party console 46A may utilize the diagnostic control module 32C and receive diagnostic information regarding the managed system element 38C. Moreover, the instrumentation data provider 44 may generate event messages compatible for use with the instrumentation platform 25. Other objects may subscribe for these events through the instrumentation platform 25 and receive the event messages without polling a results object. Additional details regarding the operation of the instrumentation data provider 44 will be described in greater detail below.

The instrumentation data consumer 42 provides a communication path between the instrumentation platform 25 and the presentation layer 40. Through the instrumentation data consumer 42, the presentation layer 40 and the console application 28 have access to diagnostic information maintained by the instrumentation platform 25. For instance, through the instrumentation data consumer 42, the presentation layer 40 can execute and receive diagnostic result messages from third-party diagnostics 46B configured for use with the instrumentation platform 25 and not otherwise usable by the console application 28. Additionally, the data consumer 42 may register to receive diagnostic event messages from the instrumentation platform 25. The event messages when received may then be converted by the data consumer 42 for use by the presentation layer 40 and the console application 28. Additional details regarding the operation of the instrumentation data consumer 42 will be described in greater detail below.

Figure 5:
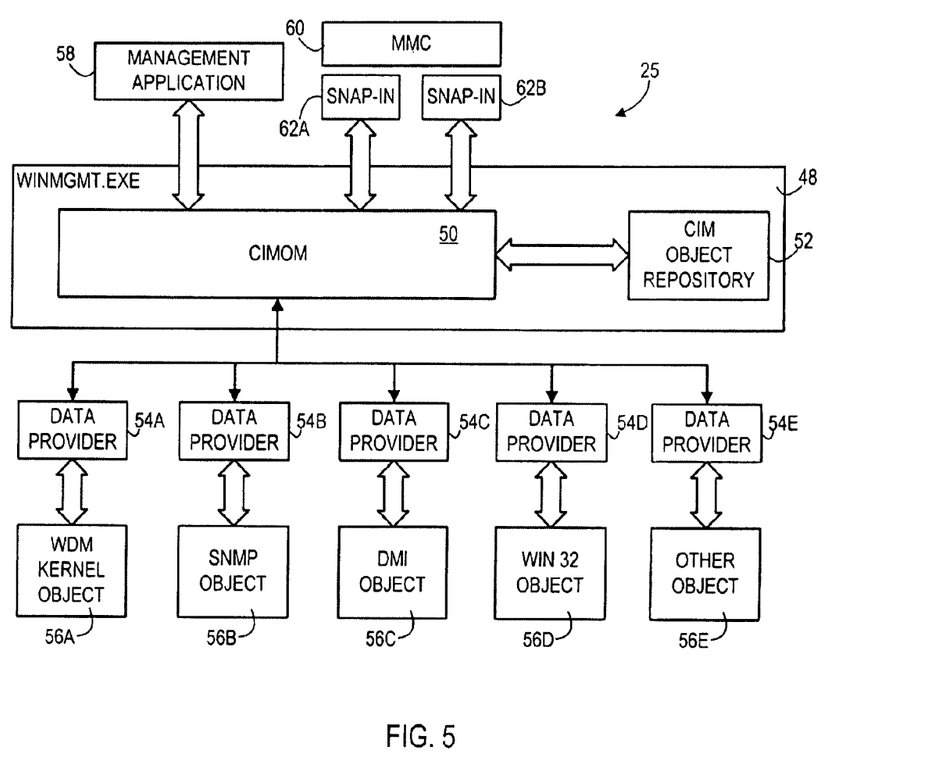
FIG. 5 is a software architecture diagram showing the architecture of an instrumentation platform utilized in various embodiments of the present invention.

Referring now to FIG. 5, an illustrative instrumentation platform 25 will be described. As described above, the instrumentation platform 25 comprises one or more executable programs for modeling components within a computer system, for receiving configuration, status, and operational information from the components, and for executing diagnostics on system components and receiving events generated by system components. In the actual embodiment of the present invention described herein, the instrumentation platform 25 is WINDOWS management instrumentation ("WMI") from MICROSOFT CORPORATION.

WMI is MICROSOFT CORPORATION'S implementation of the Desktop Management Task Force's ("DMTF") Web-Based Enterprise Management ("WBEM") initiative. As known to those skilled in the art, WMI is a set of system services and programming interfaces that allow applications to expose management instrumentation data in a consistent way. By exposing instrumentation data in a consistent fashion, management applications can be written to a single API.

WMI also provides a set of services, such as eventing, remoting, asynchronous access, scripting, and a query language, that allow applications and management tools to better access and serve instrumentation data without requiring information providers to explicitly support those features. It should be appreciated by those skilled in the art that while the actual embodiment of the present invention described herein utilizes WMI as the instrumentation platform 25, the present invention may also be practiced with other management platforms, including other implementations of WBEM.

In WMI, a single executable process, WINMGMT.EXE 48, provides all of the WMI functionality. This executable supports a Common Information Model ("CIM") object repository 52 that provides a central storage area for instrumentation data, a CIM object manager 50 ("CIMOM") that provides applications with uniform access to management data, and the APIs that together deliver WMI. Applications depend on the CIMOM 50 to handle the interface between a management application 58 and data providers 54A-54N. WMI facilitates these communications by supporting a COM interface. The WMI COM API also supplies event notification and query processing services and can be used in several programming language environments, such as 'C' and 'C++'.

The CIM repository 52 holds the CIM and associated schema, along with data information or data source details. The CIMOM 50 uses the schema data contained in the CIM repository 52 when servicing requests from a management application 58 for data regarding managed objects 56A-56N. A management application 58 is an application or operating system service that uses or processes information originating from managed objects 56A-56N. The console application 28 comprises one type of management application. Through the use of the present invention, the management application 58 may obtain instance information, write properties, and execute methods on the objects 56A-56N. A management application 58 can access managed object information by making requests to the CIMOM 50 through one of the methods provided in the WMI API. In WMI, the CIMOM 50 may also use the schema data in the CIM repository 52 when servicing requests from a management console 60 received through "snap-ins" 62A-62N.

The managed objects 56A-56N are either physical or logical enterprise components that are modeled using CIM. For example, a managed object can be hardware such as a cable, or software such as a database application. Managed objects 56A-56N may include a Windows Driver Model ("WDM") kernel object 56A, a Simple Network Management Protocol ("SNMP") object 56B, a Desktop Management Interface ("DMI") object 56C, a WIN32 object 56D, or other type of object 56N.

The CIMOM 50 communicates with the managed objects 56A-56N through the data providers 54A-54N. The data providers 54A-54N are standard COM and distributed COM ("DCOM") servers that function as mediators between the managed objects 56A-56N and the CIMOM 50. The data providers 54A-54N supply instrumentation data for parts of the CIM schema. If the CIMOM 50 receives a request from a management application 58 for data that is not available from the CIM object repository 52, or for event notifications that are not supported by the CIMOM 50, the CIMOM 50 forwards the request to the appropriate one of the data providers 54A-54N. The data providers 54A-54N can then supply data and event notifications for the specific managed object 56A-56N to the CIMOM 50. In turn, this data can be returned by the CIMOM 50 to the management application 58. As will be described below, a data provider 44 is provided herein that provides an interface between the instrumentation platform 25 and control 32 of the triplet 36. Through the use of the data provider 44, the instrumentation platform 25 can perform diagnostic functions on a managed system element 38 in the same manner that management functions are performed on the objects 56A-56N.

Instrumentation events may also be processed in WMI. An event is an occurrence that either corresponds to specific, previously defined conditions that arise (extrinsic events) or to changes in the CIM repository (intrinsic events). After an event occurs, an event provider notifies the CIMOM 50. The CIMOM 50 then delivers a notification to one or more registered recipients known as event consumers. Event consumers can register with the CIMOM 50 to receive particular types of notifications and event providers can register to supply particular types of information.

To enable event consumers to operate independently from event providers, the CIMOM 50 acts as the intermediary, matching registered consumers with responsible providers and forwarding appropriate events. As known to those skilled in the art, event consumers register to receive notifications without knowing how the events and notifications are provided. To register, these consumers specify a filter. The filter is created using the WMI Query Language ("WQL"). WQL describes the conditions under which the consumer wants to receive event notification. As will be described in greater detail below, the data provider 44 may register with the CIMOM 50 as an event provider and the data consumer 42 may register with the CIMOM 50 as an event consumer.

According to the various embodiments of the present invention, the CIMOM 50 supports the use of data providers that implement the Common Diagnostics Model ("CDM"). As known to those skilled in the art, CDM defines a methodology for adding diagnostics to the CIM. The CDM specification is governed by the DMTF and is a part of the CIM, version 2.3 and higher. According to CDM, a diagnostic is broken into two parts: a diagnostic provider and a diagnostic consumer. The diagnostic consumer is a test module that requests a test, or calls the methods in a diagnostic provider, to perform a single test or set of tests on a particular managed system element. A diagnostic provider registers itself through CIM to export events and methods supported. When a diagnostic test module queries CIM for diagnostics supported on a given device, CIM will report about the instance of the diagnostic provider, This effectively establishes communication between the provider and the consumer. The consumer can then enable events and execute methods registered by the provider. It should be appreciated that the data provider 44 performs the functions of a diagnostic provider and that the data consumer 42 performs the functions of a diagnostics consumer herein.

Figure 6:
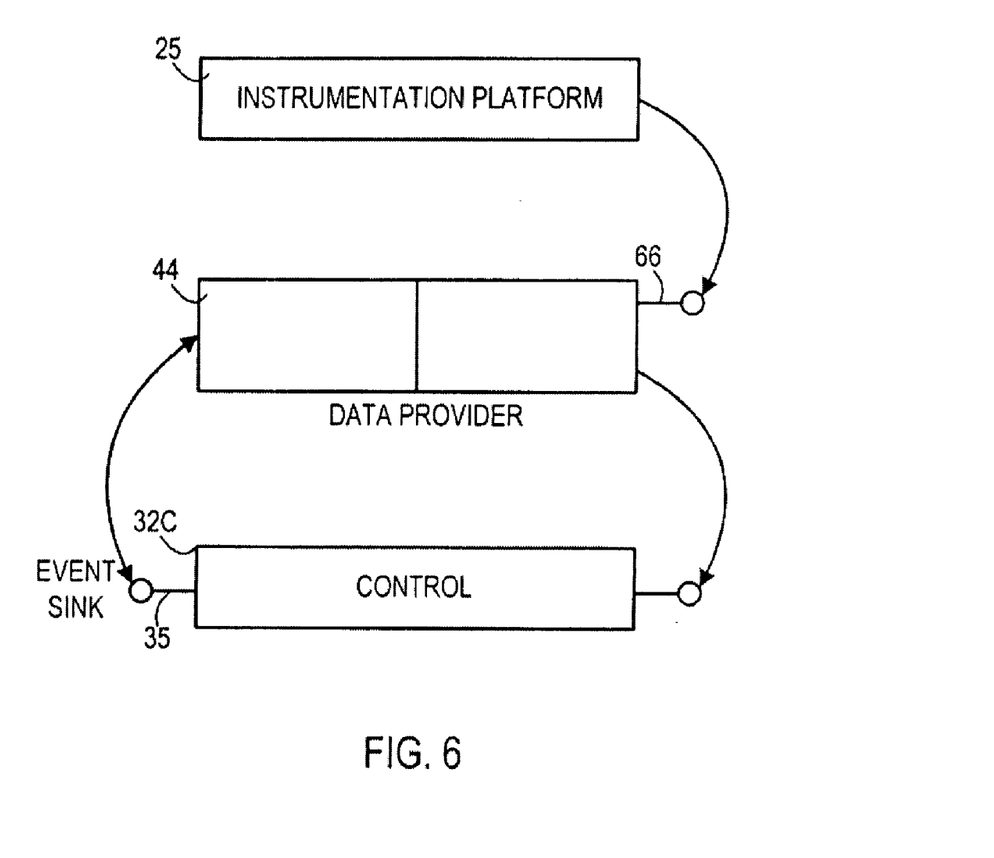
FIG. 6 is a software architecture diagram showing aspects of an instrumentation data provider module provided in one embodiment of the present invention.

Turning now to FIG. 6, additional details regarding the operation of the instrumentation data provider module 44 will be described. As shown in FIG. 6, the diagnostic control object 32C provides an interface 35 for communicating with the instrumentation data provider module 44. According to one embodiment of the invention, the interface 35 supported by the control object 32C may be called by the data provider 44 to instantiate diagnostics and perform other tasks. In particular, the interface 35 comprises an interface that is compatible with the interface 35 utilized for communication between the control object 32C and the plug-in 30C. By supporting the same interface used by the control object 30C to communicate with the plug-in 30C, the data provider 44 can provide an interface to the instrumentation platform 25 without requiring that the control 32C be rewritten.

According to one embodiment of the invention, the instrumentation data provider 44 also supports an interface 66 for communication with the instrumentation platform 25. In one embodiment of the invention, the data provider 44 provides a communication path between the instrumentation platform 25 and the diagnostic control object 32C. In this manner, the data provider 44 can convert data received from the control 32C to a format compatible with the instrumentation platform 25 and convert data received from the instrumentation platform 25 to a format compatible with the control 32C. In particular, the instrumentation platform 25 has access to the control 32C through the interface 35 and can initiate diagnostics. The control 32C can also pass diagnostic status messages back to the instrumentation platform 25 for use by the instrumentation platform 25.

According to one embodiment of the invention, the data provider 44 is also operative to register with the instrumentation platform 25 as an event provider. Once the data provider 44 has registered, data received from the control 32C can be converted to event messages compatible with the instrumentation platform 25. For instance, diagnostic status messages may be received from the control 32C and converted to event messages compatible with the instrumentation platform 25. The event messages may then be provided to data consumers that have registered to receive the event messages.

Figure 7:
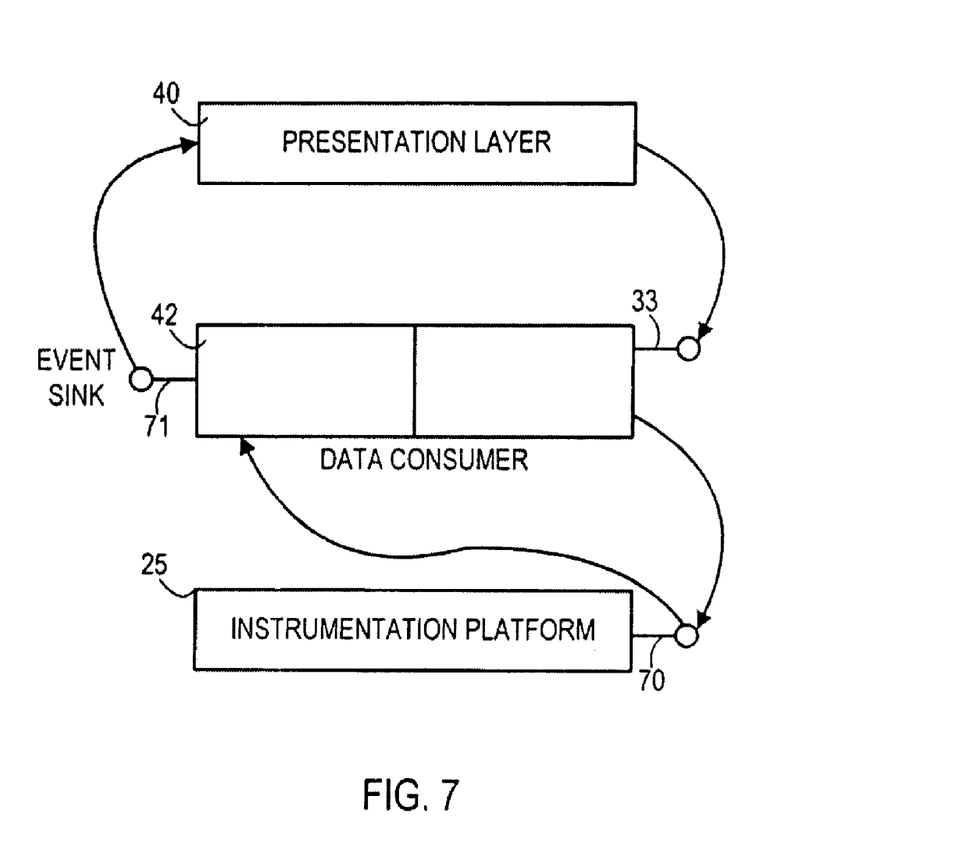
FIG. 7 is a software architecture diagram showing aspects of data consumer module provided in one embodiment of the present invention.

Referring now to FIG. 7, additional details regarding the instrumentation data consumer module 42 will be provided. As described briefly above, the data consumer module 42 provides an interface 33 for communication with a presentation layer 40. According to one embodiment of the invention, the interface 33 supports a legacy interface utilized by the presentation layer 40 for communication with the plug-in 30C. By supporting a legacy interface, the data consumer module 42 can provide the presentation layer 40 with access to the instrumentation platform 42 without requiring that the presentation layer 40 be rewritten.

The data consumer module 42 also includes an event sink 71 for receiving event messages from the instrumentation platform 25. The data consumer module 42 is also operative to convert data received from the instrumentation platform 25 to a format compatible with the presentation layer 40 and to convert data received from the presentation layer 40 to a format compatible with the instrumentation platform 25. In particular, according to one embodiment of the present invention, the data consumer 42 is operative to register with the instrumentation platform 25 as an event consumer. By registering with the instrumentation platform 25 as an event consumer, the data consumer 42 will receive event messages via the event sink 71. In this manner, the data consumer 42 can receive event messages, such as diagnostic event messages, from the instrumentation platform 25 without having to poll a results object. The data consumer 42 may then pass the event messages to the presentation layer 40.

Figure 8:
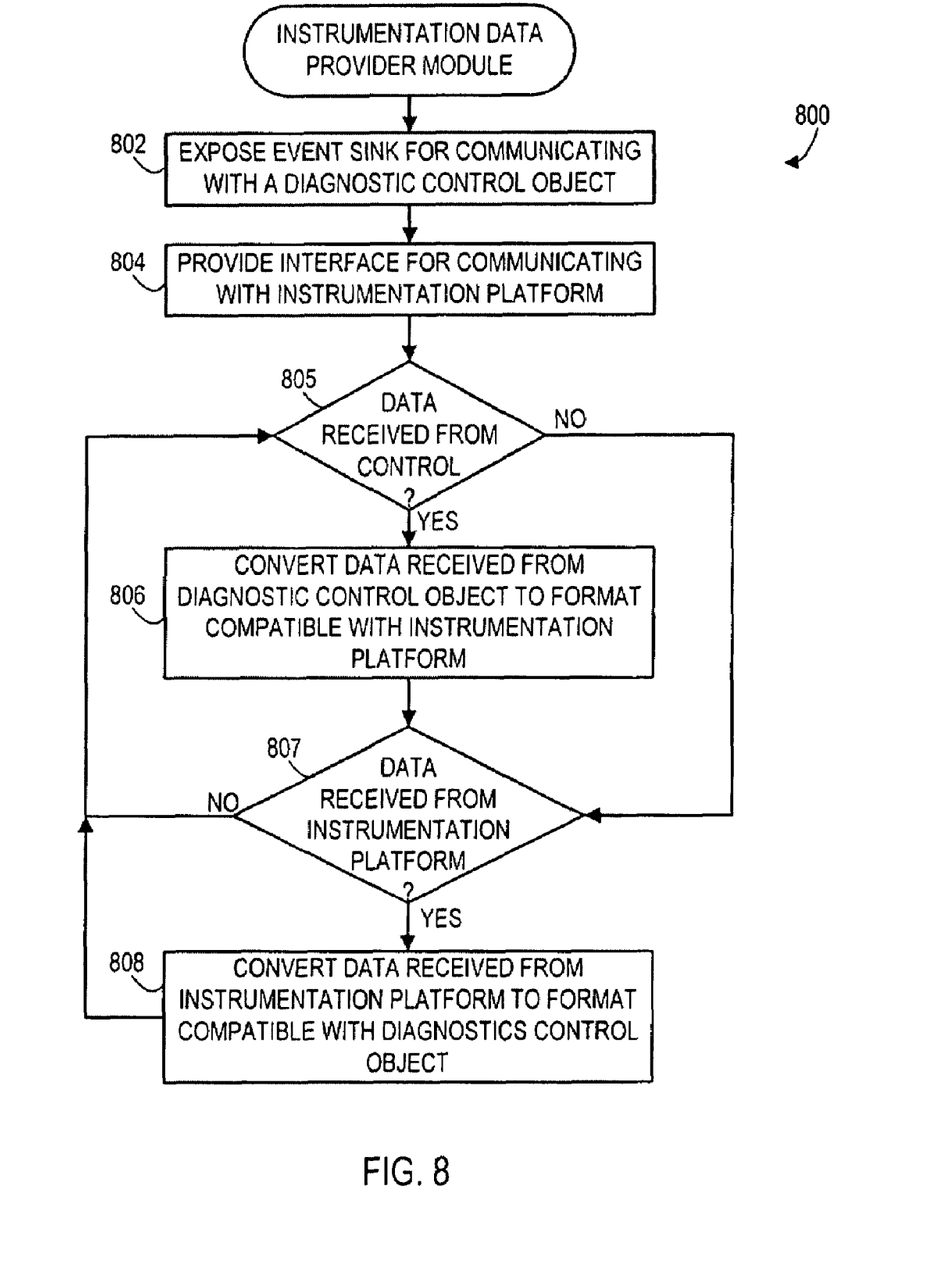
FIG. 8 is a flow diagram illustrating the operation of an instrumentation data provider module utilized in various embodiments of the present invention.

Referring now to FIG. 8, an illustrative routine 800 will be described illustrating the operation of the instrumentation data provider module 44 according to one actual embodiment of the present invention. The routine 800 begins at block 802, where the diagnostic control object 32C provides an interface 35 for communicating with an instrumentation data provider module 44. As described above, the interface 35 comprises a legacy interface supported by the diagnostic control object 32C in one embodiment of the present invention.

From block 802, the routine 800 continues to block 804, where the instrumentation data provider module 44 provides an interface 66 for communicating with an instrumentation platform 25. As described above, the data provider 44 can generate instrumentation event messages to the instrumentation platform 25 through the interface. Moreover, the data provider 44 can return instrumentation information to the instrumentation platform 25 in response to queries.

From block 804, the routine 800 continues to block 805. At block 805, a determination is made as to whether data has been received at the data provider module 44 from the control object 32C. If data has been received from the control, the routine 800 continues to block 806. If data has not been received from the control, the routine 800 branches to block 807. At block 806, the data provider 44 converts data received from the diagnostic control object 32C to a format compatible with the instrumentation platform 25. As described above, this process may include converting diagnostic status messages and other types of messages received from the control 32C to event messages compatible with the instrumentation platform 25. Other types of data received from the control 32C may also similarly be converted to a format compatible with the instrumentation platform 25.

The routine 800 continues from block 806 to block 807, where a determination is made as to whether data has been received at the data provider module 44 from the instrumentation platform 25. If data has not been received from the instrumentation platform 25, the routine 800 branches back to block 805. If data has been received from the instrumentation platform 25, the routine 800 continues to block 808. At block 808, the data provider 44 converts data received from the instrumentation platform 25 to a format compatible with the diagnostic control object 32C. As described above, this allows the instrumentation platform 25 to execute diagnostics and request information from the control 32C. From block 808, the routine 800 returns to block 805, where the conversion process is repeated.

Figure 9:
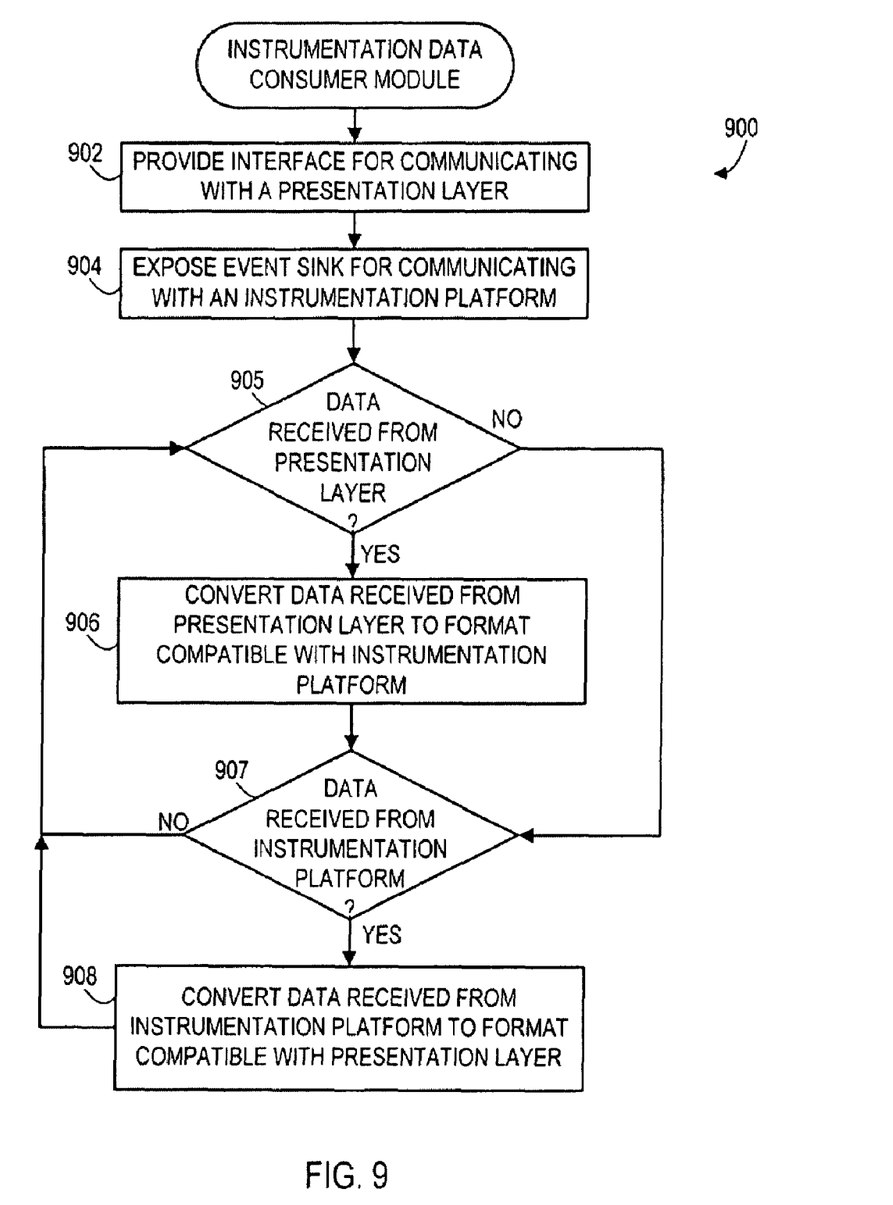
FIG. 9 is a flow diagram illustrating the operation of an data consumer module utilized in various embodiments of the present invention.

Turning now to FIG. 9, a routine 900 will be described that illustrates the operation of an instrumentation data consumer module 42 according to one actual embodiment of the invention. The routine 900 begins at block 902, where the instrumentation data consumer module 42 provides an interface 33 for communicating with the presentation layer 40. As described above, the interface 33 comprises a legacy interface supported by the presentation plug-in 30C in one embodiment of the present invention.

From block 902, the routine 900 continues to block 904, where the instrumentation data consumer module 42 exposes an event sink 71 for receiving messages from an instrumentation platform 25. As described above, the data provider 44 can register to receive instrumentation event messages with the instrumentation platform 25 through the event sink 71. From block 904, the routine 900 continues to block 905, where a determination is made as to whether data was received at the instrumentation data consumer module 42 from the presentation layer 40. If data was not received from the presentation layer 40, the routine 900 branches from block 905 to block 907. If data was received from the presentation layer 40, the routine 900 continues from block 905 to block 906.

At block 906, the data consumer 42 converts data received from the presentation layer 40 to a format compatible with the instrumentation platform 25. As described above, this process may include converting requests for diagnostic data and other types of messages received from the presentation layer 40 to messages compatible with the instrumentation platform 25. Other types of data received from the presentation layer 40 may also similarly be converted to a format compatible with the instrumentation platform 25.

The routine 900 continues from block 906 to block 907, where a determination is made as to whether data has been received at the instrumentation data consumer module 42 from the instrumentation platform 25. If data was not received from the instrumentation platform 25, the routine 900 branches back to block 905. If data was received from the instrumentation platform, the routine continues from block 907 to block 908. At block 908, the data consumer 42 converts data received from the instrumentation platform 25 to a format compatible with the presentation layer 40. For instance, the data consumer 42 may convert event messages received from the instrumentation platform 25 to a format compatible with the presentation layer 40. As described above, this allows the presentation layer 40 to receive and display diagnostic information from the instrumentation platform 25. From block 908, the routine 900 returns to block 905, where the conversion process is repeated.

Based upon the foregoing, it should be appreciated that embodiments of the invention provide a method, system, computer-controlled apparatus, and computer-readable medium for reporting diagnostic event messages. The above specification, examples and data provide a complete description of the manufacture and use of the invention. Since many embodiments of the invention can be made without departing from the spirit and scope of the invention, the invention resides in the claims hereinafter appended.

We claim:

1. A computer-readable storage medium storing computer-executable instructions which, when executed, provide:

an instrumentation data provider module for interfacing a diagnostic control object and an instrumentation platform, the instrumentation data provider module comprising an interface for communicating with the diagnostic control object;

an interface for communicating with the instrumentation platform; and program code for converting diagnostic information received from the diagnostic control object to a format compatible with the instrumentation platform, and for converting data received from the instrumentation platform to a format compatible with the diagnostic control object.

2. The computer-readable storage medium of claim 1, wherein the interface for communicating with the diagnostic control object comprises a legacy interface supported by the diagnostic control object and by a presentation plug-in object utilized by the diagnostic control object outside the instrumentation platform.

3. The computer-readable storage medium of claim 2, wherein the diagnostic information received from the diagnostic control object comprises a diagnostic status message and wherein converting diagnostic information received from the diagnostic control object to a format compatible with the instrumentation platform comprises converting the diagnostic status message to an event message compatible for use with the instrumentation platform.

4. A method for interfacing a diagnostic control object and an instrumentation platform, the method comprising:

providing a first interface at an instrumentation data provider module for communicating with the diagnostic control object;

providing a second interface at the instrumentation data provider module for communicating with the instrumentation platform;

receiving diagnostic information from the diagnostic control object at the first interface, converting the diagnostic information to a format compatible with the instrumentation platform, and transmitting the converted diagnostic information to the instrumentation platform; and receiving data at the second interface, converting the data to a format compatible with the diagnostic control object, and transmitting the converted data to the diagnostic control object.

5. The method of claim 4, wherein the converted data is transmitted to the diagnostic control object via a legacy interface supported by the diagnostic control object and by a presentation plug-in object utilized by the diagnostic control object outside the instrumentation platform.

6. The method of claim 5, wherein the diagnostic information received comprises a diagnostic status message, wherein converting the diagnostic information to a format compatible with the instrumentation platform comprises converting the diagnostic status message to an event message compatible for use with the instrumentation platform, and wherein transmitting the converted data to the instrumentation platform comprises transmitting the event message to the instrumentation platform.

7. A computer-readable storage medium comprising computer-executable instructions which, when executed by a computer, cause the computer to perform the method of claim 4.

8. A computer-controlled apparatus executing the method of claim 4.

9. A computer-readable storage medium storing computer-executable instructions which, when executed, provide an instrumentation data consumer module for interfacing a presentation layer and an instrumentation platform, the instrumentation data consumer module comprising:
    an interface for communicating with the presentation layer;
    an event sink for communicating with the instrumentation platform; and
    program code for converting data received from the presentation layer to a format compatible with the instrumentation platform, and for converting diagnostic information received from the instrumentation platform to a format compatible with the presentation layer.

10. The computer-readable storage medium of claim 9, wherein the diagnostic information received from the instrumentation platform comprises diagnostic event messages and wherein the program code is farther operative to register with the instrumentation platform to receive the diagnostic event messages.

11. The computer-readable storage medium of claim 10, wherein the interface for communicating with the presentation layer comprises a legacy interface supported by the presentation layer and also supported by a presentation plug-in object.

12. A method for interfacing a presentation layer and an instrumentation platform, the method comprising:
    providing an interface for communicating with the presentation layer;
    providing an event sink for communicating with the instrumentation platform;
    receiving data from the presentation layer and converting the data to a format compatible with the instrumentation platform; and
    receiving diagnostic information from the instrumentation platform and converting the diagnostic information to a format compatible with the presentation layer.

13. The method of claim 12, wherein the diagnostic information received from the instrumentation platform comprises diagnostic event messages.

14. The method of claim 13, further comprising registering with the instrumentation platform to receive the diagnostic event messages.

15. The method of claim 14, wherein the interface for communicating with the presentation layer supports a legacy interface utilized by the presentation layer and utilized by a legacy presentation plug-in object.

16. A computer-readable storage medium comprising computer-executable instructions which, when executed by a computer, cause the computer to perform the method of claim 12.

17. A computer-controlled apparatus executing the method of claim 12.

18. A computer-readable storage medium storing computer-executable instructions which, when executed provide:
    an instrumentation data consumer module for interfacing a presentation layer and an instrumentation platform, the instrumentation data consumer module comprising an interface for communicating with the presentation layer, an event sink for communicating with the instrumentation platform, and program code for converting data received from the presentation layer to a format compatible with the instrumentation platform, and for converting diagnostic information received from the instrumentation platform to a format compatible with the presentation layer; and
    an instrumentation data provider module for interfacing a diagnostic control object and the instrumentation platform, the instrumentation data provider module comprising a first interface for communicating with the diagnostic control object, a second interface for communicating with the instrumentation platform, and program code for converting diagnostic information received from the diagnostic control object to a format compatible with the instrumentation platform, and for converting data received from the instrumentation platform to a format compatible with the diagnostic control object.

19. The computer-readable storage medium of claim 18, wherein the diagnostic information received from the diagnostic control object comprises a diagnostic status message and wherein converting diagnostic information received from the diagnostic control object to a format compatible with the instrumentation platform comprises converting the diagnostic status message to an event message compatible for use with the instrumentation platform.

20. The computer-readable storage medium of claim 19, wherein the diagnostic information received from the instrumentation platform comprises diagnostic event messages and wherein the instrumentation data provider module program code is further operative to register with the instrumentation platform to receive the diagnostic event messages.

* * * * *